(12) United States Patent
Huang

(10) Patent No.: US 8,253,858 B2
(45) Date of Patent: Aug. 28, 2012

(54) MULTIMEDIA DEVICE CAPABLE OF DETECTING CONNECTION STATUS OF EXTERNAL DISPLAY DEVICES

(75) Inventor: Bo-Song Huang, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 216 days.

(21) Appl. No.: 12/868,740

(22) Filed: Aug. 26, 2010

(65) Prior Publication Data

US 2012/0019718 A1      Jan. 26, 2012

(30) Foreign Application Priority Data

Jul. 26, 2010   (CN) .......................... 2010 1 0236688

(51) Int. Cl.
    *H04N 5/44*    (2006.01)
    *H04N 5/08*    (2006.01)
(52) U.S. Cl. ........ 348/553; 348/552; 348/739; 348/530; 348/540

(58) Field of Classification Search .................. 348/540, 348/500, 552, 553, 558, 739, 530, 689, 708
See application file for complete search history.

(56) References Cited

U.S. PATENT DOCUMENTS

| 5,486,869 A * | 1/1996 | Cooper ......................... 348/525 |
| 6,937,294 B1 * | 8/2005 | Hojabri ......................... 348/707 |

\* cited by examiner

*Primary Examiner* — Jefferey Harold
*Assistant Examiner* — Jean W Desir
(74) *Attorney, Agent, or Firm* — Altis Law Group, Inc.

(57) ABSTRACT

A multimedia device generates and outputs video signals to a display component and an external display device, and includes a video output circuit and a load detection circuit. The load detection circuit isolates and buffers the video output circuit and the load detection circuit, and retrieves horizontal sync signals from the video signals. The load detection circuit further amplifies and integrates the retrieved horizontal sync signals to output direct current signals, and finally compares the direct current signals with a predetermined voltage to output a control signal indicating a connection between the video output circuit and the external display device. The multimedia device turns off the display component according to the control signal indicating that the video output circuit has been connected to the external display device.

16 Claims, 3 Drawing Sheets

MULTIMEDIA DEVICE CAPABLE OF DETECTING CONNECTION STATUS OF EXTERNAL DISPLAY DEVICES

BACKGROUND

1. Technical Field

The disclosure relates to multimedia devices, and particularly to a multimedia device capable of detecting connection status of an external display device.

2. Description of Related Art

Mobile multimedia devices, such as, portable computers and mobile TVs, usually have a small-sized display screen. Many mobile multimedia devices also have video interfaces to connect to larger-sized external display devices in order to provide a larger viewing ability to multiple viewers. However, the mobile multimedia devices cannot detect if the external display devices are connected to the video interfaces, so when the external display devices are connected to the video interfaces and are displaying video data, the internal display screens display same video data, which results in excess power consumption.

DETAILED DESCRIPTION

Figure 1:
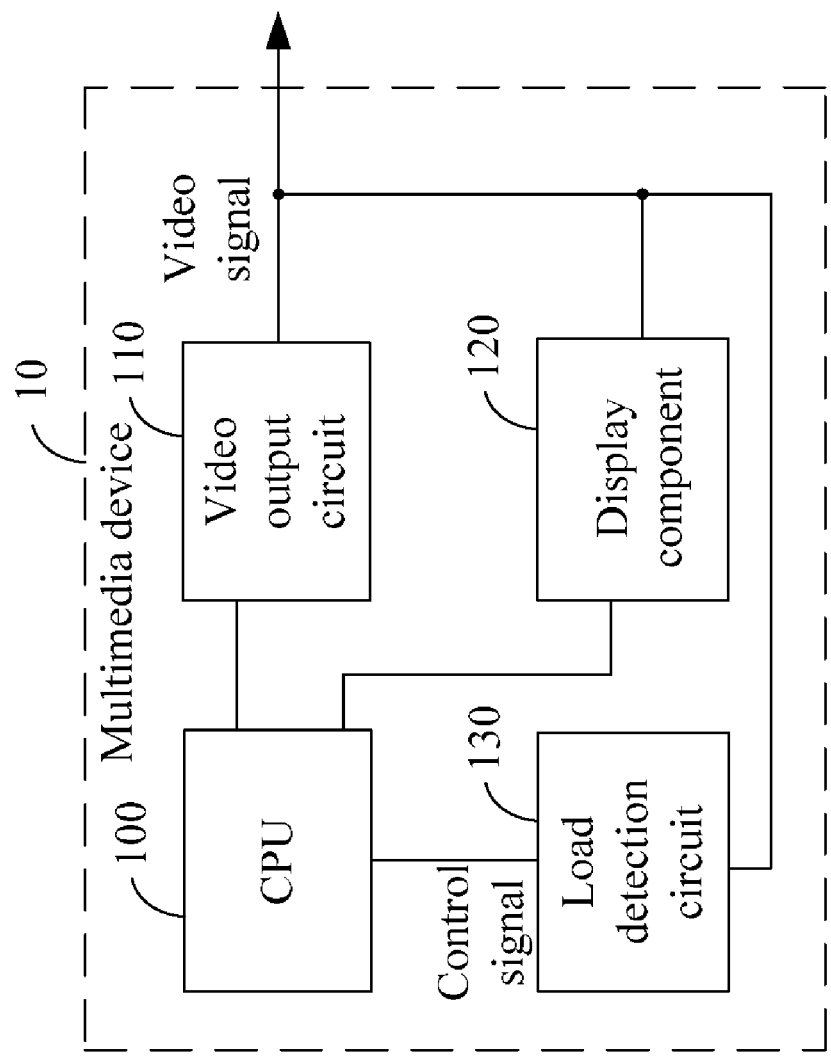
FIG. 1 is a schematic diagram of an embodiment of a multimedia device.

FIG. 1 is a schematic diagram of an embodiment of a multimedia device 10. In one embodiment, the multimedia device 10 may be a portable computer or a mobile TV, which includes internal display module, and can be connected to an external display device to display video signals. As shown in FIG. 1, the multimedia device 10 includes a central processing unit (CPU) 100, a video output circuit 110, a display component 120, and a load detection circuit 130. The CPU 100 generates video signals. In one embodiment, the video signals may be analog video signals. The CPU 100 includes a digital video encoder and a digital to analog converter (not shown). The digital video encoder generates digital video signals according to video data, and outputs the digital video signals to the digital to analog converter. The digital to analog converter converts the digital video signal into analog video signals, and outputs the analog video signals to the video output circuit 110. In one embodiment, the analog video signals output by the CPU 100 include horizontal sync signals, color sync signals, and brightness signals. The horizontal sync signals are negative pulse signals with a predetermined frequency, for example, of 25 MHz. The voltage of the horizontal sync signal is about, −0.3V, in one embodiment.

The video output circuit 110 receives the video signals from the CPU 100, and outputs the video signals to the display component 120 and the external display device for display. The video output circuit 110 includes a filter circuit and a matching circuit (not shown). The filter circuit receives the video signals from the CPU 100, and filters noise in the video signals. The matching circuit is configured for impedance matching between the video output circuit 110 and the display component 120 and between the video output circuit 110 and the external display device. The display component 120 and the external display device both have a load impedance of about 75Ω, in one example. The matching circuit is configured to have the same impedance, by using a 75Ω resistor.

In one embodiment, when the video output circuit 110 is connected to the external display device, the horizontal sync signals that are output from the video output circuit 110 have a voltage of about −0.3V. When the video output circuit is not connected to the external display device, the horizontal sync signals that are output from the video output circuit 110 have a voltage of about −0.6V.

Figure 2:
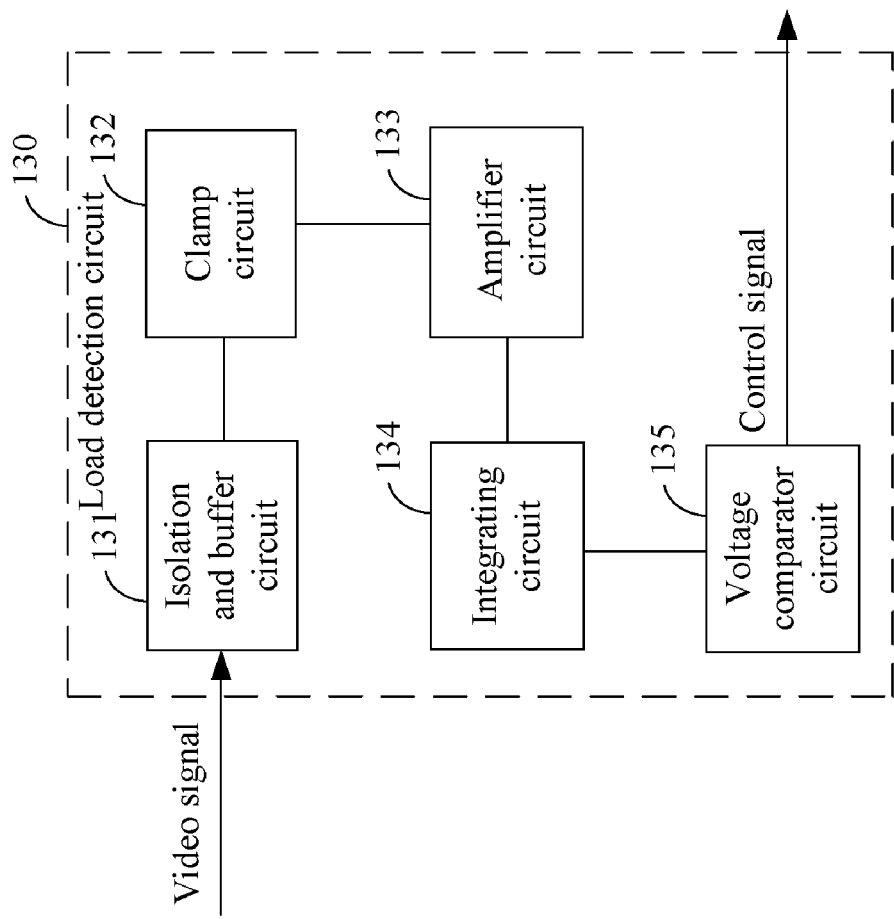
FIG. 2 is a schematic diagram of an embodiment of a load detection circuit of a multimedia device.

The load detection circuit 130 is connected to the CPU 100 and an output of the video output circuit 110, and detects a connection between the video output circuit 110 and the external display device so as to generate a control signal. As shown in FIG. 2, the load detection circuit 130 includes an isolation and buffer circuit 131, a clamp circuit 132, an amplifier circuit 133, an integrating circuit 134, and a voltage comparator circuit 135. The isolation and buffer circuit 131 isolates and buffers the video output circuit 110 and the load detection circuit 130, where "isolation" means video signals can only be transmitted from the previous video output circuit 110 to the following load detection circuit 130, and signals cannot be transmitted from the following load detection circuit 130 to the previous video output circuit 110. In one embodiment, the isolation and buffer circuit 131 has an input resistor with a high resistance and an output resistor with a low resistance in order to avoid the influence of the load detection circuit 130 on the video signals that are output from the video output circuit 110.

The clamp circuit 132 filters the color sync signals and the brightness signals in the video signals, and retrieves the horizontal sync signals from the video signals. Thus, the brightness signals with different brightness are filtered to insure stable outputs of the voltage comparator circuit 135, which insures better detection of the load detection circuit 130.

The amplifier circuit 133 amplifies the retrieved horizontal sync signals to amplify the voltage differences between the video output circuit 110 connected and not connected to the external display device. The integrating circuit 134 integrates the amplified horizontal sync signals, and outputs direct current signals. Because the horizontal sync signals are discrete pulse signals, which make outputs of the voltage comparator circuit 135 unstable, the integrating circuit 134 transforms the amplified horizontal sync signals to direct current signals, which is convenient for comparison.

The voltage comparator circuit 135 compares the direct current signals with a predetermined voltage, and outputs the control signal to the CPU 100. In one embodiment, the control signal may be logic high or low level signals, for example, "1" indicating a logic high level signal, and "0" indicating a logic low level signal. In one embodiment, when the video output circuit 110 is connected to the external display device, the voltage comparator circuit 135 outputs the logic high level signal to the CPU 100. When the video output circuit 110 is not connected to the external display device, the voltage comparator circuit 135 outputs the logic low level signal to the CPU 100. In alternative embodiments, the voltage comparator circuit 135 outputs the logic high level signal to the CPU 100 when the video output circuit 110 is not connected to the external display device, and outputs the logic low level signal to the CPU 100 when the video output circuit 110 is connected to the external display device.

The CPU 100 further controls the display component 120 according to the control signal indicating that the video output circuit 110 has been connected to the external display device. In one embodiment, the CPU 100 turns off the display component 120 to reduce power consumption when the control signal indicates that the video output circuit 110 is connected to the external display device. In alternative embodiments, the CPU 100 controls the display component 120 to display video signals different from the video signals output to the external display device when the control signal indicates that the video output circuit 110 is connected to the external display device. Thus, two different video signals can be displayed, which is appealing for users.

The load detection circuit 130 detects when the multimedia device 10 is connected to external display device, and makes the CPU 100 turn off the display component 120 or control the display component 120 to display different video signals. Thus, power consumption is reduced, and the multimedia device 10 is more appealing and has more expanded uses.

Figure 3:
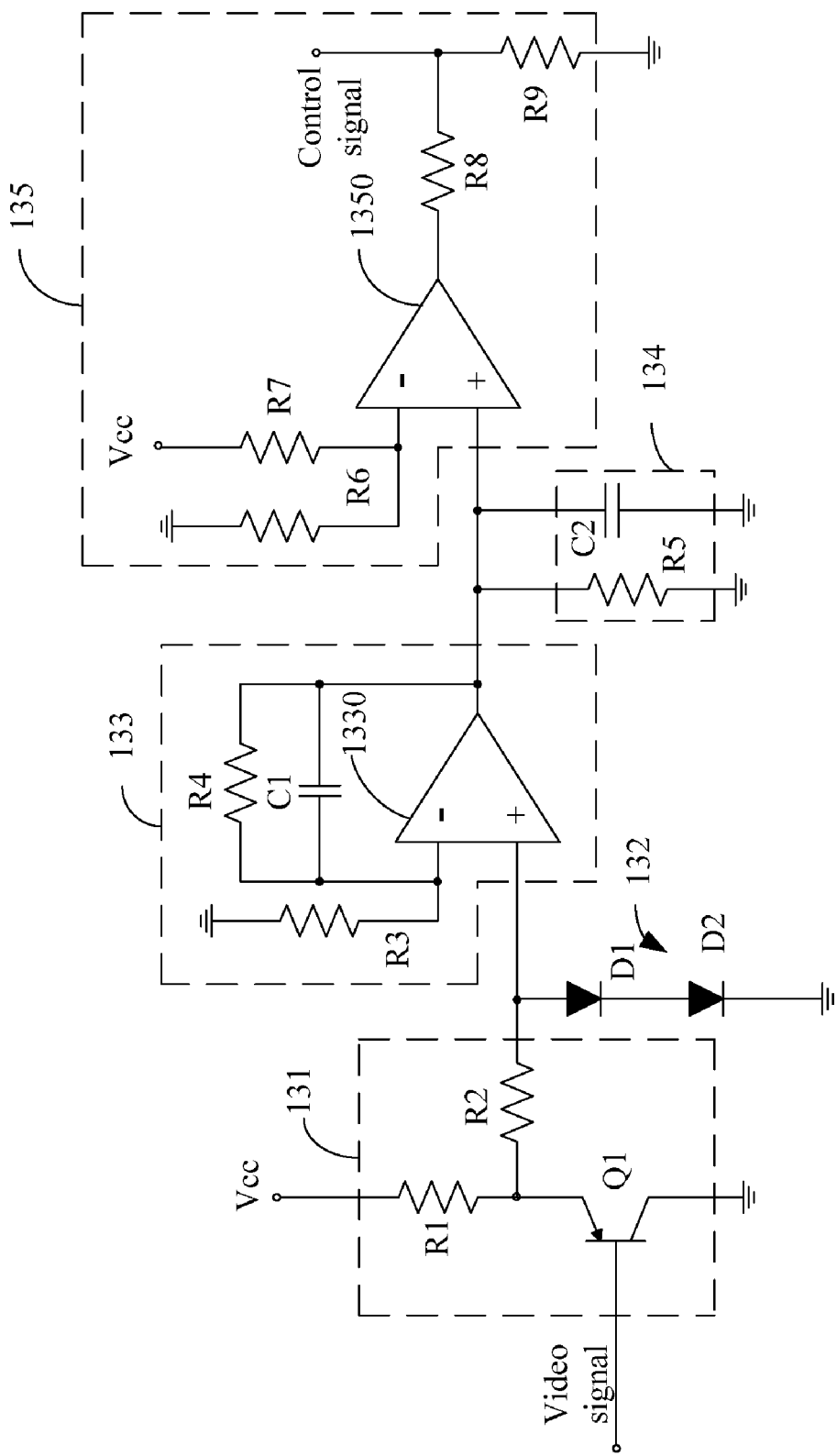
FIG. 3 is a circuit diagram of an embodiment of a load detection circuit of a multimedia device.

FIG. 3 is a circuit diagram of one embodiment of the load detection circuit 130. The isolation and buffer circuit 131 includes a switch element Q1, and the switch element Q1 includes a control pole, a first pole, and a second pole. The control pole receives the video signals from the video output circuit 110, the first pole is connected to a reference voltage Vcc via a first resistor R1 and outputs the video signals, and the second pole is grounded. In one embodiment, the switch element Q1 is an emitter follower, which turns the input video signals into output from an emitter without power consumption, that is, the switch element Q1 is a pnp type transistor. The control pole is a base, the first pole is an emitter, and the second pole is a collector. In alternative embodiments, the switch element Q1 may be a metal-oxide-semiconductor field-effect transistor (MOSFETs) or a diode, which can be turned on in a single direction to output the video signals to the clamp circuit 132 and avoid signals transmitted from the clamp circuit 132 to the video output circuit 110. Thus, quality of the video signals can be insured. In one embodiment, the reference voltage Vcc may be 5V.

The clamp circuit 132 includes two diodes D1 and D2 forwardly connected in series. An anode of a first diode D1 receives the video signals from the isolation and buffer circuit 130, that is, from the emitter of switch element Q1, via a second resistor R2, and a cathode of a second diode D2 is grounded. The diodes D1 and D2 filter the color sync signals and the brightness signals in the video signals, retrieve the horizontal sync signals from the video signals, and output the horizontal sync signals from the anode of the first diode D1.

The amplifier circuit 133 includes an operational amplifier 1330, the operational amplifier 1330 includes a positive input, a negative input, and an output. The positive input receives the horizontal sync signals from the clamp circuit 132, and the negative input is grounded via a third resistor R3. The output outputs the amplified horizontal sync signals, and is connected to the negative input via a fourth resistor and a first capacitor connected in parallel, which forms a negative feedback.

The integrating circuit 134 includes a fifth resistor R5 and a second capacitor C2 connected in parallel. One end of the fifth resistor R5 and the second capacitor C2 are both connected to the amplifier circuit 133 and the voltage comparator circuit 135, and the other end of the fifth resistor R5 and the second capacitor C2 are both grounded.

The voltage comparator circuit 135 includes a comparator 1350, and the comparator 1350 includes a positive input, a negative input, and an output. The positive input receives the direct current signals from the integrating circuit 134, and the negative input is grounded via a sixth resistor R6 and connected to the reference voltage Vcc via a seventh resistor R7. The output is grounded via an eighth resistor R8 and a ninth resistor R9, and outputs the control signal through a connection end between the eighth resistor R8 and the ninth resistor R9.

In one embodiment, the video output circuit 110 outputs the video signals to the switch element Q1 of the isolation and buffer circuit 131. Because the first pole of the switch element Q1 is connected to the reference voltage Vcc of 5V, the switch element Q1 keeps turned on, and outputs the video signals to the clamp circuit 132 from the first pole. After filtering and clamping, the clamp circuit 132 outputs the horizontal sync signals from the anode of the first diode D1 to the positive input of the operational amplifier 1330. The operational amplifier 1330 amplifies and outputs the horizontal sync signals, and the integrating circuit 134 transforms the amplified horizontal sync signals into stable direct current signals, and outputs the direct current signals to the positive input of the comparator 1350. Because voltage of the horizontal sync signals of the video signals is different when the video output circuit 110 is connected to or not connected to the external display device, for example, −0.3V and −0.6V, amplitudes of the direct current signals are different under different connection statuses, which makes the comparator 1350 output different control signals under different connection statuses. Thus, the CPU 100 can control the display component 120 according to the control signals.

The load detection circuit 130 cooperates with the operational amplifier 1330, the comparator 1350, the transistor Q1, and several resistors and capacitors, thus the load detection circuit 130 includes simple circuits and a low cost.

The foregoing disclosure of various embodiments has been presented for purposes of illustration and description. It is not intended to be exhaustive or to limit the disclosure to the precise forms disclosed. Many variations and modifications of the embodiments described herein will be apparent to one of ordinary skill in the art in light of the above disclosure. The scope of the disclosure is to be defined only by the claims appended hereto and their equivalents.

What is claimed is:

1. A multimedia device comprising a display component, the multimedia device configured to output video signals to the display component and an external display device, the multimedia device further comprising:
   a central processing unit, operable to generate the video signals, wherein the video signals comprise horizontal sync signals;
   a video output circuit, operable to output the video signals to the display component and the external display device; and
   a load detection circuit, connected to the central processing unit and an output of the video output circuit, operable to detect a connection between the video output circuit and the external display device so as to generate a control signal, the load detection circuit comprising:
   an isolation and buffer circuit, operable to isolate and buffer the video output circuit and the load detection circuit;
   a clamp circuit, operable to retrieve the horizontal sync signals from the video signals;
   an amplifier circuit, operable to amplifying the retrieved horizontal sync signals;
   an integrating circuit, operable to integrate the amplified horizontal sync signals and output direct current signals; and
   a voltage comparator circuit, operable to compare the direct current signals with a predetermined voltage and output the control signal to the central processing unit;
   wherein the central processing unit turns off the display component according to the control signal indicating that the video output circuit has been connected to the external display device.

2. The multimedia device of claim 1, wherein the isolation and buffer circuit comprises a switch element comprising a control pole, a first pole, and a second pole, wherein the control pole receives the video signals, the first pole is connected to a reference voltage via a first resistor and outputs the video signals, and the second pole is grounded.

3. The multimedia device of claim 2, wherein the switch element is a pnp type transistor, the control pole is a base, the first pole is an emitter, and the second pole is a collector.

4. The multimedia device of claim 1, wherein the clamp circuit comprises two diodes forwardly connected in series, an anode of a first diode receives the video signals via a second resistor from the isolation and buffer circuit and outputs the horizontal sync signals, and a cathode of a second resistor is grounded.

5. The multimedia device of claim 1, wherein the amplifier circuit comprises an operational amplifier comprising a positive input, a negative input, and an output, the positive input receives the horizontal sync signals from the clamp circuit, the negative input is grounded via a third resistor, and the output outputs the amplified horizontal sync signals and is connected to the negative input via a fourth resistor and a first capacitor connected in parallel.

6. The multimedia device of claim 1, wherein the integrating circuit comprises a fifth resistor and a second capacitor connected in parallel, one end of the fifth resistor and the second capacitor are both connected to the amplifier circuit and the voltage comparator circuit, and the other end of the fifth resistor and the second capacitor are both grounded.

7. The multimedia device of claim 1, wherein the voltage comparator circuit comprises a comparator comprising a positive input, a negative input, and an output, the positive input receives the direct current signals, the negative input is grounded via a sixth resistor and connected to a reference voltage via a seventh resistor, and the output is grounded via an eighth resistor and a ninth resistor and outputs the control signal through a connection end between the eighth resistor and the ninth resistor.

8. A multimedia device comprising a display component, the multimedia device outputting video signals to the display component and an external display device, the multimedia device further comprising:
a central processing unit, operable to generate the video signals, wherein the video signals comprise horizontal sync signals;
a video output circuit, operable to output the video signals to the display component and the external display device; and
a load detection circuit, connected to the central processing unit and an output of the video output circuit, operable to detect a connection between the video output circuit and the external display device so as to generate a control signal, the load detection circuit comprising:
an isolation and buffer circuit, operable to isolate and buffer the video output circuit and the load detection circuit;
a clamp circuit, operable to retrieve the horizontal sync signals from the video signals;
an amplifier circuit, operable to amplifying the retrieved horizontal sync signals;
an integrating circuit, operable to integrate the amplified horizontal sync signals and output direct current signals; and
a voltage comparator circuit, operable to compare the direct current signals with a predetermined voltage and output the control signal to the central processing unit;
wherein the central processing unit further controls the display component according to the control signal indicating that the video output circuit has been connected to the external display device.

9. The multimedia device of claim 8, wherein the central processing unit turns off the display component when the video output circuit is connected to the external display device.

10. The multimedia device of claim 8, wherein the central processing unit controls the display component to display video signals different from the video signals output to the external display device when the video output circuit is connected to the external display device.

11. The multimedia device of claim 8, wherein the isolation and buffer circuit comprises a switch element comprising a control pole, a first pole, and a second pole, wherein the control pole receives the video signals, the first pole is connected to a reference voltage via a first resistor and outputs the video signals, and the second pole is grounded.

12. The multimedia device of claim 11, wherein the switch element is a pnp type transistor, the control pole is a base, the first pole is an emitter, and the second pole is a collector.

13. The multimedia device of claim 8, wherein the clamp circuit comprises two diodes forwardly connected in series, an anode of a first diode receives the video signals via a second resistor from the isolation and buffer circuit and outputs the horizontal sync signals, and a cathode of a second resistor is grounded.

14. The multimedia device of claim 8, wherein the amplifier circuit comprises an operational amplifier comprising a positive input, a negative input, and an output, the positive input receives the horizontal sync signals from the clamp circuit, the negative input is grounded via a third resistor, and the output outputs the amplified horizontal sync signals and is connected to the negative input via a fourth resistor and a first capacitor connected in parallel.

15. The multimedia device of claim 8, wherein the integrating circuit comprises a fifth resistor and a second capacitor connected in parallel, one end of the fifth resistor and the second capacitor are both connected to the amplifier circuit and the voltage comparator circuit, and the other ends of the fifth resistor and the second capacitor are both grounded.

16. The multimedia device of claim 8, wherein the voltage comparator circuit comprises a comparator comprising a positive input, a negative input, and an output, the positive input receives the direct current signals, the negative input is grounded via a sixth resistor and connected to a reference voltage via a seventh resistor, and the output is grounded via an eighth resistor and a ninth resistor and outputs the control signal through a connection end between the eighth resistor and the ninth resistor.

* * * * *